J. F. Ostrander,
Filtering Cock,
No. 4,440. Patented Apr. 4, 1846.
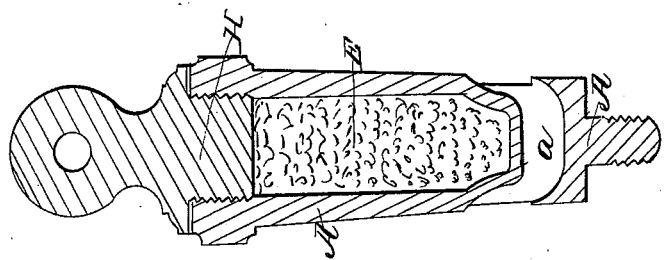
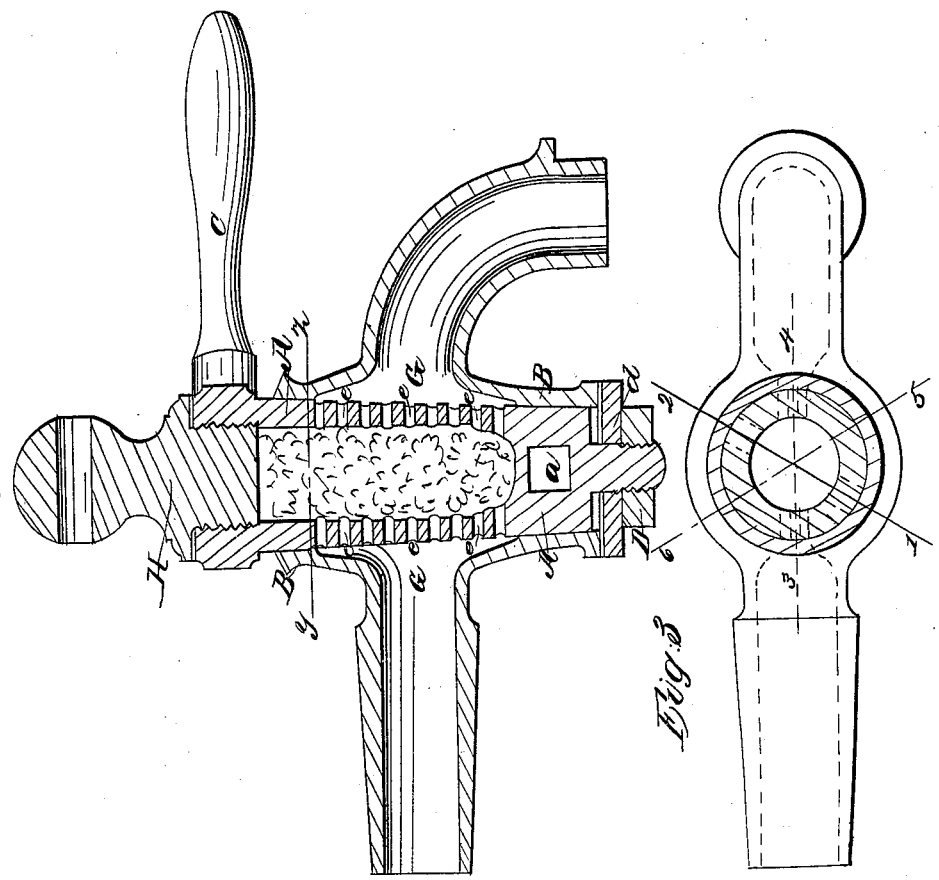

UNITED STATES PATENT OFFICE.

JONATHAN F. OSTRANDER, OF NEW YORK, N. Y.

IMPROVEMENT IN FILTERING-COCKS.

Specification forming part of Letters Patent No. 4,440, dated April 4, 1846.

*To all whom it may concern:*

Be it known that I, JONATHAN F. OSTRANDER, of the city of New York, in the State of New York, have invented a new and useful Improvement in Faucets or Stop-Cocks; and I do hereby declare that the following is a full, clear, and exact description thereof, with references to drawings annexed, illustrating my invention and forming part of this specification, in which—

Figure I represents a section through the center line vertically and longitudinally of a cock containing my improvement; Fig. II, a section of the plug detached from the body of the cock in a central and vertical plane different from that before taken, and Fig. III a top view of the part of the cock below the red line Y Z in Fig. I.

My invention relates to the common faucet or stop-cock used in plumber's work for drawing liquids from vessels or attached to small conduit-pipes which lead water from the street-mains into dwelling-houses, factories, &c.; and it consists in converting the plug of the cock into a filter, so that the liquid may at pleasure be made either to pass through some filtering or straining substance before it issues from the cock or be allowed to flow unobstructedly, as in the ordinary cock. The manner in which I accomplish this is as follows: In constructing the cock I make the plug (lettered A in the drawings annexed) a little longer than the plug of an ordinary cock of the same delivery for reasons which will hereinafter appear, and the chamber or barrel B, which receives the plug, is of corresponding dimensions. The hole *a* in the plug, through which the water may flow without obstruction or as it does in the common cock, is placed near to the lower end, and the handle or lever C, by which the cock is opened and shut, is cast upon the side of the plug at the upper end. At the lower end the plug is provided with the usual nut D and washer *d* to keep it in its place. The interior of the plug is bored out from the top down to within a short distance of the hole *a*, near the lower end, to form a cavity for the filtering material E, and two sets of small holes *e e* are drilled through the sides of the plug into the cavity to allow the water to pass through the filter. The sets of holes are opposite each other, but not in the same vertical plane with the hole of free flow. They are placed about one-sixth of the circumference of the plug to the right or left of it, so that when the plug is turned to let the water pass through the filtering material E it cannot run through the hole of free flow *a*, and vice versa. In order to increase the effective filtering-surface the plug and barrel are made longer in proportion than those of an ordinary stop-cock, as was before stated. This permits the hole G through the main part or body of the cock to be much elongated vertically where it opens into the barrel on either side, so that a greater extent of surface of the plug may be perforated with the small holes *e e* opening into the interior cavity. There is screwed into the top of the plug a stopper H, which serves the double purpose of closing the cavity so that the water cannot issue at the top and of compressing more tightly the filtering material. This material may be wool, sponge, felt, or any other suitable substance. When it is desired to make the water flow through the hole of free discharge *a*, the handle is turned in the direction of the line 3 4 in Fig. III. To make it pass through the filter the handle coincides with the line 1 2, and to shut the cock entirely it coincides with the line 5 6. The filter is cleansed by reversing the positions of the sets of holes *e e*, so that the water shall flow through it in the opposite direction. When from long use or any other cause it becomes necessary to repack the filter, the handle is turned so that the water is entirely shut off, the stopper H is unscrewed, the worn-out material is removed and replaced by a fresh quantity, which is forced into the cavity with the requisite degree of pressure, and the stopper is screwed in again.

I do not claim the placing of a filter in the plug or core of a stop-cock; but

What I do claim as my invention, and desire to secure by Letters Patent, is—

The combination of the filtering-core with the auxiliary passage *a* for allowing an unobstructed flow of the water, substantially as herein described.

JONATHAN F. OSTRANDER.

Witnesses:
   GEO. D. BALDWIN,
   P. F. STIRLING.